United States Patent
Rodden

[19]

[11] Patent Number: 6,125,778
[45] Date of Patent: Oct. 3, 2000

[54] BALLAST WATER TREATMENT

[76] Inventor: Raymond M. Rodden, 443 Donaldson Ave., Pacifica, Calif. 94044

[21] Appl. No.: 09/268,023

[22] Filed: Mar. 15, 1999

Related U.S. Application Data

[60] Provisional application No. 60/078,041, Mar. 16, 1998, and provisional application No. 60/088,829, Jun. 10, 1998.

[51] Int. Cl.$^7$ ...................................................... B63B 25/08
[52] U.S. Cl. .......................... 114/74 R; 114/125; 210/755
[58] Field of Search ............................... 114/74 R, 74 A, 114/74 T, 222, 125; 210/744, 755

[56] References Cited

U.S. PATENT DOCUMENTS

| | | | |
|---|---|---|---|
| 4,176,061 | 11/1979 | Stopka | 210/63 Z |
| 5,040,487 | 8/1991 | Bollyky et al. | 119/268 |
| 5,090,351 | 2/1992 | Goldbach et al. | 114/65 R |
| 5,192,451 | 3/1993 | Gill | 210/755 |
| 5,215,686 | 6/1993 | Sheckler et al. | 261/122.1 |
| 5,320,056 | 6/1994 | Marinzoli | 114/74 R |
| 5,520,131 | 5/1996 | Goldbach | 114/74 R |
| 5,520,821 | 5/1996 | Screptock et al. | 114/74 A |
| 5,560,874 | 10/1996 | Sheckler et al. | 261/122.1 |
| 5,803,004 | 9/1998 | Swann et al. | 114/74 A |
| 5,816,181 | 10/1998 | Sherman, Jr. | 114/125 |

*Primary Examiner*—Jesus D. Sotelo
*Attorney, Agent, or Firm*—Philip D. Freedman

[57] ABSTRACT

A treatment provides an effective, safe; and economical method to render ballast water free of contaminating organisms. A ballast water treatment system includes a source of ozone and a ballast tank connected to the source of ozone. In a method of controlling organisms in ballast water of a sea faring vessel, the ballast water is treated with ozone while the vessel is in transit between ports.

38 Claims, 6 Drawing Sheets

FIG. 4

BALLAST WATER TREATMENT

This application claims the benefit of Provisional Application Ser. No. 60/078,041 filed Mar. 16, 1998, entitled "Ballast Water Treatment" and the benefit of Provisional Application Ser. No. 60/088,829 filed Jun. 10, 1998, entitled "In Transit Bilge Water Treatment."

BACKGROUND OF THE INVENTION

The present invention relates to a system and method for ozone treatment of ballast water during transit of a vessel from one port to another.

A sea faring vessel routinely docks at a first port where it is loaded with a cargo that the vessel transports to a second port where the cargo is unloaded. The vessel then returns to the first port where it is loaded with another cargo. Typically, the vessel travels empty from the second port back to the first port to pick up another cargo. The vessel is equipped with ballast tanks that can be filled with water to maintain the balance of the vessel on an even keel when it travels empty. Conventional ballast tanks can include valves usually mounted over apertures through tank bulkheads. The valves are actuated to move water between and into and out of various ballast tanks to trim the vessel when empty of cargo or when carrying an unevenly distributed cargo.

The vessel fills its ballast tanks by taking on sea water, usually at its cargo discharge port. The sea water is charged into the ballast tanks at the same time that the vessel off loads its cargo. The vessel then travels to its cargo loading port where it takes on cargo while at the same time it empties at least some and typically all of its ballast tanks by discharging the ballast water into the loading port water environment.

The ballast water intake is below the water line of a vessel usually at or near the vessel hull bottom. The ballast water contains algae, zooplankton and other organisms that are indigenous to the cargo discharge port. Significant quantities of these indigenous organisms are loaded into the ballast tanks along with the water. The vessel then transports these organisms to a cargo loading port where the organisms are discharged into the water environment along with discharged ballast water. The organisms may not be indigenous to the water environment of the cargo loading port. Some of these organisms may be deleterious to and very much unwanted in the loading port environment. They cause damage to the water environment and replace benthic organisms and clear plankton communities that provide food and larvae for resident native species in overlying waters.

The zebra mussel (*Dreissena polymorpha*) is an example of an unwanted organism that has been spread by ballast water. The zebra mussel was first found in the mid eighteenth century in the northern Caspian Sea and in the Ural River. Since then the mussel has quickly spread to other parts of the world by means of ballast water discharge. The mussel has threadlike tentacles that enable the mussel to adhere to any vertical or horizontal surface. The mussel reproduces quickly and attaches to any hard underwater surface. It is particularly adherent to the shell of another mussel. Stacks of mussels can completely clog water intake orifices. In a short time, they reach population densities in excess of 30,000 mussels per square meter. Zebra mussels have been known to completely shut down municipal water treatment plants and industrial water systems.

The spread of the zebra mussel and other nonindigenous organisms is an immense problem. The mussel was found in the Great Lakes in late 1988. It is believed that it was carried to North America in the ballast of ships from Europe. It was first prevalent in Lake Erie. Since then, the mussel has spread into Lake Michigan and into rivers of the Midwest and Northeast.

In 1996, Congress passed the National Invasive Species Act (P. L. 104–332) to stem the spread of nonindigenous organisms by ballast water discharge. The act reauthorized the Great Lakes ballast management program and expanded applicability to vessels with ballast tanks. The Act requires the Secretary of Transportation to develop national guidelines to prevent the spread of organisms and their introduction into U.S. waters via ballast water of commercial vessels.

The Act establishes guidelines that require that vessels that enter U.S. waters after operating undertake ballast exchange in the high seas. In this method, a vessel empties its ballast on the high seas and refills the ballast tanks with sea water. However, the emptying of ballast tanks causes an imbalance that makes the exchange of ballast water exchange on the high seas both dangerous and sometimes impossible because of weather conditions. Additionally, high seas exchange requires manpower that many vessels do not have or cannot economically provide. There remains a need for an effective and economical ballast water treatment process to prevent the spread of nonindigenous organisms.

SUMMARY OF THE INVENTION

According to the present invention, ballast water of a vessel is treated with ozone while the vessel is in transit between ports. The treatment provides an effective, safe; and economical method to render ballast water free of contaminating organisms. The invention relates to a ballast water treatment system, comprising a source of ozone and a ballast tank connected to the source of ozone and to a method of controlling organisms in ballast water of a sea faring vessel wherein the ballast water is treated with ozone while the vessel is in transit between ports.

DETAILED DESCRIPTION OF THE INVENTION

Ozone ($O_3$) is an allotropic form of oxygen. It is an unstable blue gas with a pungent odor, a molecular weight of 48 g/mol and a density as a gas of 2.154 g/liter at 0° and 1 atm. It is approximately 13 times more soluble in water than is oxygen. Ozone is highly unstable and is a powerful oxidizing agent. It is 1.5 times better and approximately 3125 times faster than chlorine as an oxidizer. It is benign and non-persistent and has a very short half-life. Its half-life in pure distilled water is approximately 40 min at pH 7.6. Because of the unstable nature of the $O_3$ molecule, it cannot be stored but must be generated on-site.

Ozone in seawater interacts rapidly with iodides and bromides in seawater to form hypoiodite and hypobromite, which are quickly oxidized to bromine and iodine. Bromine and iodine are toxic to live ballast water organisms such as plankton, barnacles, clams, mussels, copepods, diatoms, juvenile fish and other species.

According to the invention, ballast water of a vessel is treated with ozone while the vessel is in transit between ports. The treatment provides an effective, safe; and economical method to render ballast water free of contaminating organisms. In another aspect of the invention, organisms in an aqueous environment contained in a tank, are treated by high pressure injection of ozone. The high pressure injection can be in a range of between about 80 psi and about 120 psi. High pressure injection treatment is particularly useful for in transit ozone treating of ballast water. In another aspect, ballast water in the tanks of a vessel, particularly a double hull tanker, can be sequentially batch treated. Upon completion of the ozone treating step, a flow of air can be injected into the ballast water to prevent back flow and to enhance treatment of the ballast water as hereinafter described. In another aspect, the ozone can be injected into the ballast water via a high pressure bubble diffuser that produces a high velocity stream of small uniform bubbles of ozone. In a final aspect, a relationship is determined among rate of ozone treatment, period of ozone treatment and requirements for substantial biokill of organisms within a unit of ballast water charged into ballast tanks of a vessel at a first port. The ballast water in the vessel is then treated according to the relationship while the vessel is in transit to a second port.

These and other features will become apparent from the following detailed discussion, which by way of example without limitation describes preferred embodiments of the present invention.

Referring to FIGS. 1 to 5, a tanker 2 includes a bow 4, a stern 6 and a double hull formed from outer hull 8 and inner hull 10. Tanker 2 can be a very large carrier designed for transporting crude oil. However, the present invention can be applied to any sea faring ship or vessel that has ballast tanks or bilge water. Tanker 2 is representative of the types of vessels encompassed within the invention and is a conventionally proportioned double hulled oil tanker having cargo compartments within inner hull 10. The tanker 2 is typical of vessels that transport partly or fully refined or residual petroleum or other bulk liquid products such as seed oil.

Tank section 12 of tanker 2 is formed by the interior surface of inner hull 10 and includes a port tank section 14 and a starboard tank section 16, which are separated by longitudinal bulkhead 18. The longitudinal bulkhead 18 extends the length of tank section 12. The port tank section 14 and starboard tank section 16 are divided along their lengths by transverse bulkheads 20. The transverse bulkheads 20 extend into the spacing between outer hull 8 and inner hull 10. The spacing is also divided by plating 22, which together with transverse bulkheads 20 divide the double hull spacing into a plurality of ballast tanks 24.

The ballast tanks 24 are filled or partially filled with water to maintain the balance of the tanker 2 on an even keel, particularly when it travels empty or partially filled. Tanker 2 typically fills its ballast tanks 24 by taking on water at its cargo discharge port. This water contains species indigenous to the discharge port. As described aforesaid, these species may be harmful to the environment at a cargo loading port where ballast water is discharged to balance added weight of loaded cargo. The tanker 2 may exchange the ballast water in open sea to avoid discharge at the loading port. However, this is a dangerous and labor intensive procedure. According to the present invention, ballast water is treated with ozone while the tanker 2 is in transit between ports to destroy the harmful species. Then, the treated ballast water can be discharged at a loading port without introducing foreign species into the loading port environment.

Figure 8:
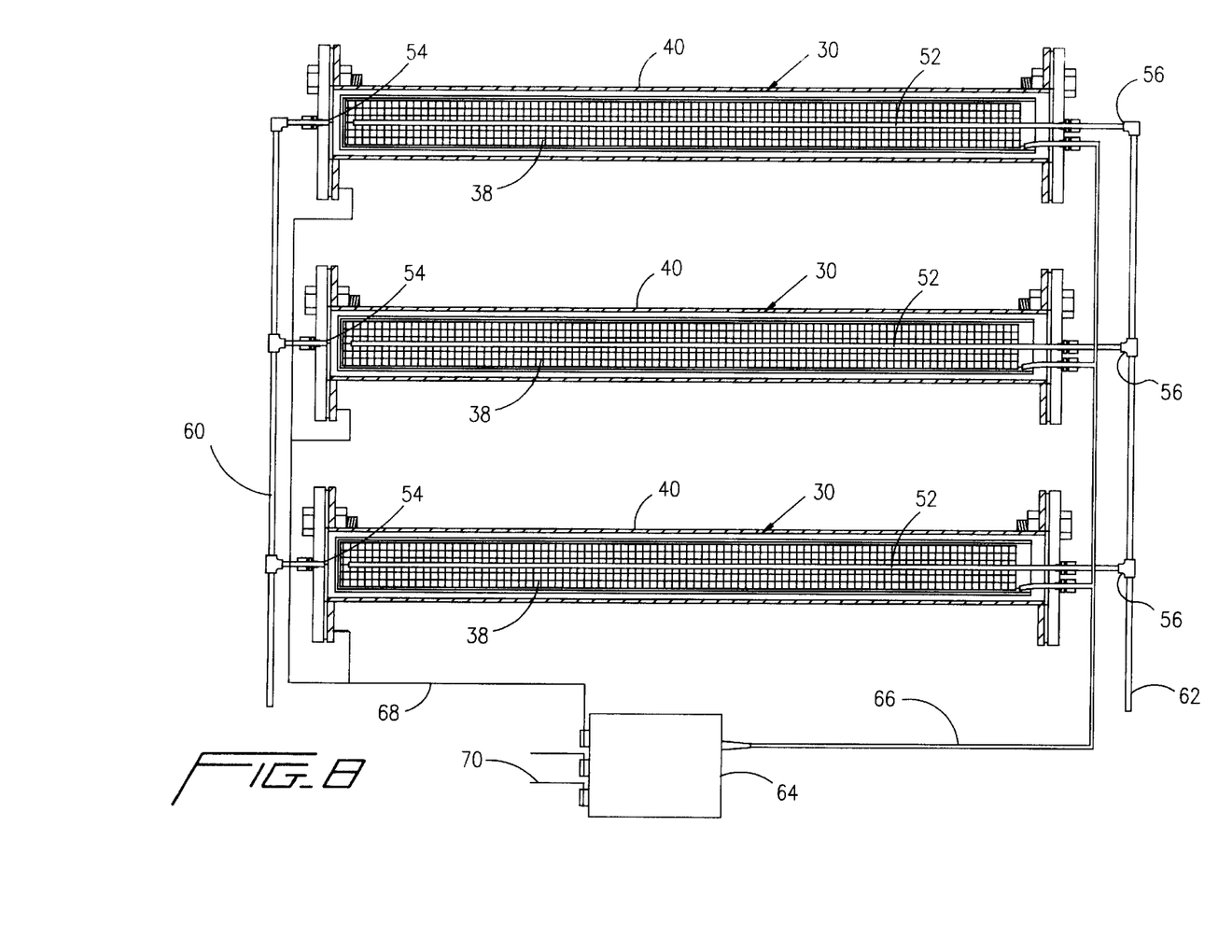
FIG. 8 shows an array of generators of FIG. 6 and FIG. 7 arranged to produce ozone for treatment of ballast water according to the invention.

The in transit ozone treatment of ballast water is conducted by means of a treatment system shown in FIGS. 1 to 5. The system includes a source of ozone that can be located anywhere on a vessel with ballast water in need of treatment. In FIGS. 1 to 5, an ozone generator 30 is located on bridge 26 of aft section 28. Ozone generator 30 can be any apparatus for the generation of ozone. Preferably, ozone generator 30 includes a tubular generator as shown in FIGS. 6 to 7 or a battery of tubular ozone generators as shown in FIG. 8. The generator 30 includes an outer tubular electrode casing 32, which can be stainless steel. Within outer tubular electrode 32 and concentric therewith is tube 34 that comprises a dielectric material such as glass. The dielectric tube 34 terminates in a closed end 36. Inner tubular electrode 38 is adjacent the inner surface of tubular electrode 32 to form an electrode/dielectric. Inner tubular electrode 38 can be made of any material or structure suitable to form an electrode. For example, the electrode 38 can be a solid integral structure such as a tube or a conductive surface coated onto dielectric tube 34. Preferably the inner tubular electrode 38 is a stainless steel mesh structure for reasons hereinafter described.

Outer tubular electrode 32, tubular dielectric 34 and tubular inner electrode 38 are concentric to one another as shown and are separated to form corona discharge zone 40. Outer tubular electrode 32 is capped by transparent end caps 42, 44. The concentric electrodes 32 and 38 and dielectric 34 and the end caps 42, 44 are secured to flanges 46 by means of nut and bolt combinations 48 with gaskets 50 intervening between the end caps 42, 44 and respective flanges 46.

Lead 51 connects inner electrode 38 to a high voltage source (not shown). Ozone containing gas output port 54 connects to corona discharge zone 40 through product end cap 42 to provide a discharge of product ozone gas from the generator 30. Feed air is injected into the generator 40 by means of tubular gas injector 52 at injector feed gas end 56 and is discharged from generator 30 as ozone containing gas from the output port 54. As shown in the preferred embodiment, the tubular gas injector 52 extends concentric with the inner tubular electrode 38, dielectric 34 and outer tubular electrode 32 to terminate in an injector discharge end 58 that is within close proximity to the dielectric tube closed end 36. The extending injector 52 enables injection of feed gas into the generator 30 at a point within proximity to the closed end 36 of dielectric 34 to permit feed gas flow to initially sweep substantially the entire length of the inner surface (inside diameter) of the tubular electrode 38 prior to feed of the gas into corona discharge zone 40. Additionally, discharge of feed gas within a proximity of closed end 36 results in a net lateral flow of feed gas from feed gas end 56 of tubular gas injector 52 to ozone output port 54 of the generator 30.

Referring to FIG. 8, connector conduit 60 is shown connecting a battery of ozone generators 30 via respective ports 54 to provide ozone to a treatment zone. Feed gas conduit 62 provides feed gas to respective tubular gas injectors 52 at injector feed gas ends 56. High voltage is applied to each corona discharge zone 40 of each generator 30 to convert oxygen in the feed gas to ozone. Each inner tubular electrode 38 of each generator 30 is connected to transformer 64 via high voltage lead 66 and is grounded via ground lead 68. Transformer 64 generates high voltage from line voltage 70 to provide corona discharge in each corona discharge zone 40.

A battery of ozone generators 30 as shown in FIG. 8, can provide a high pressure of ozone preferably in the range of 80 to 120 psi. Conventional ozone generators generate pressure heads in the order of 6 to 12 psi. Some tankers comprise over 100 tanks of ballast water. Each tank must be treated. According to the invention, a series of tanks are connected via off lines 78 to ozone feed line 74. Some of the off lines 78 are connected well downstream from the ozone generator 30 toward the termination of the feed line 74. Conventional ozone generators are inadequate to substantially treat all the tanks of ballast water within a reasonable time such as the period of a voyage from a discharge port to a loading port. The battery of ozone generators 30 shown in FIG. 8 accomplish the treatment of ballast water of even the largest sea faring vessel within the period of a voyage.

Figure 1:
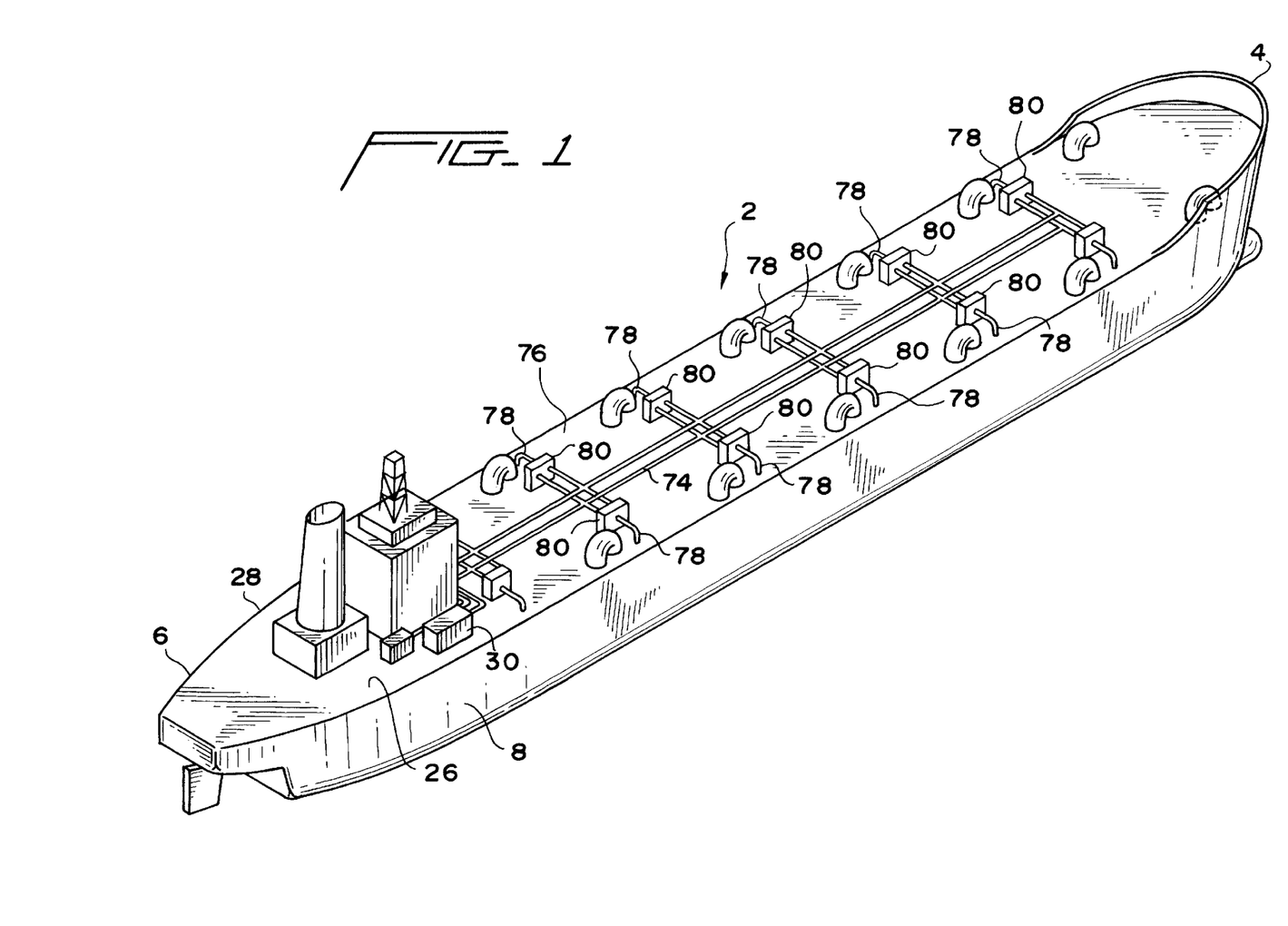
FIG. 1 is a schematic perspective view of a double hulled tanker and a ballast water treatment system.
Figure 2:
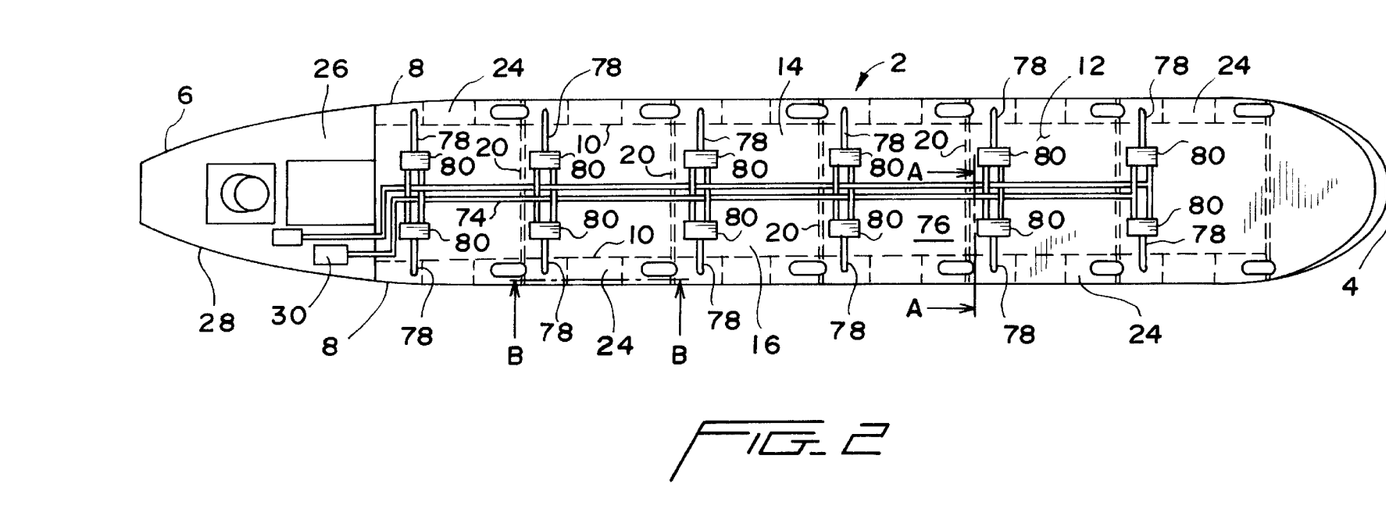
FIG. 2 is a schematic top view of the tanker and treatment system.
Figure 3:
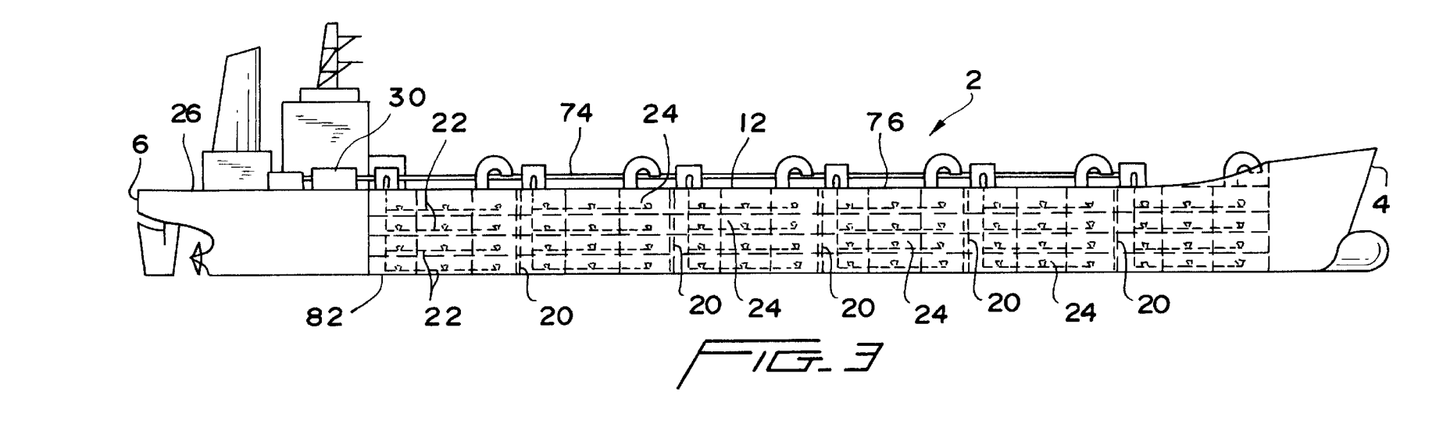
FIG. 3 is a schematic side view of the tanker and treatment system.
Figure 4:
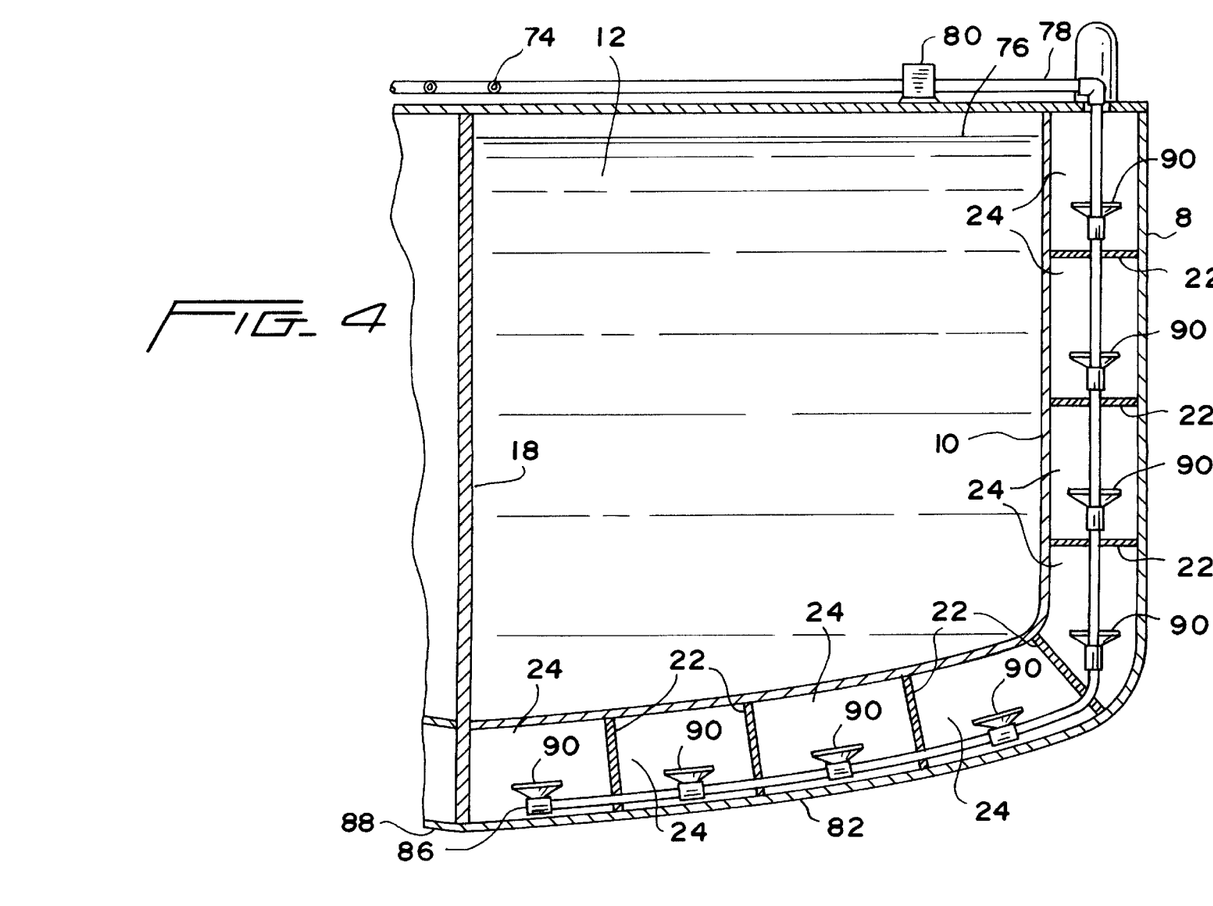
FIG. 4 is a cutaway fragmentary larger scale transverse cross-sectional view of the tanker along line A—A of FIG. 3 showing below deck portions of ballast tanks and treatment system.
Figure 5:
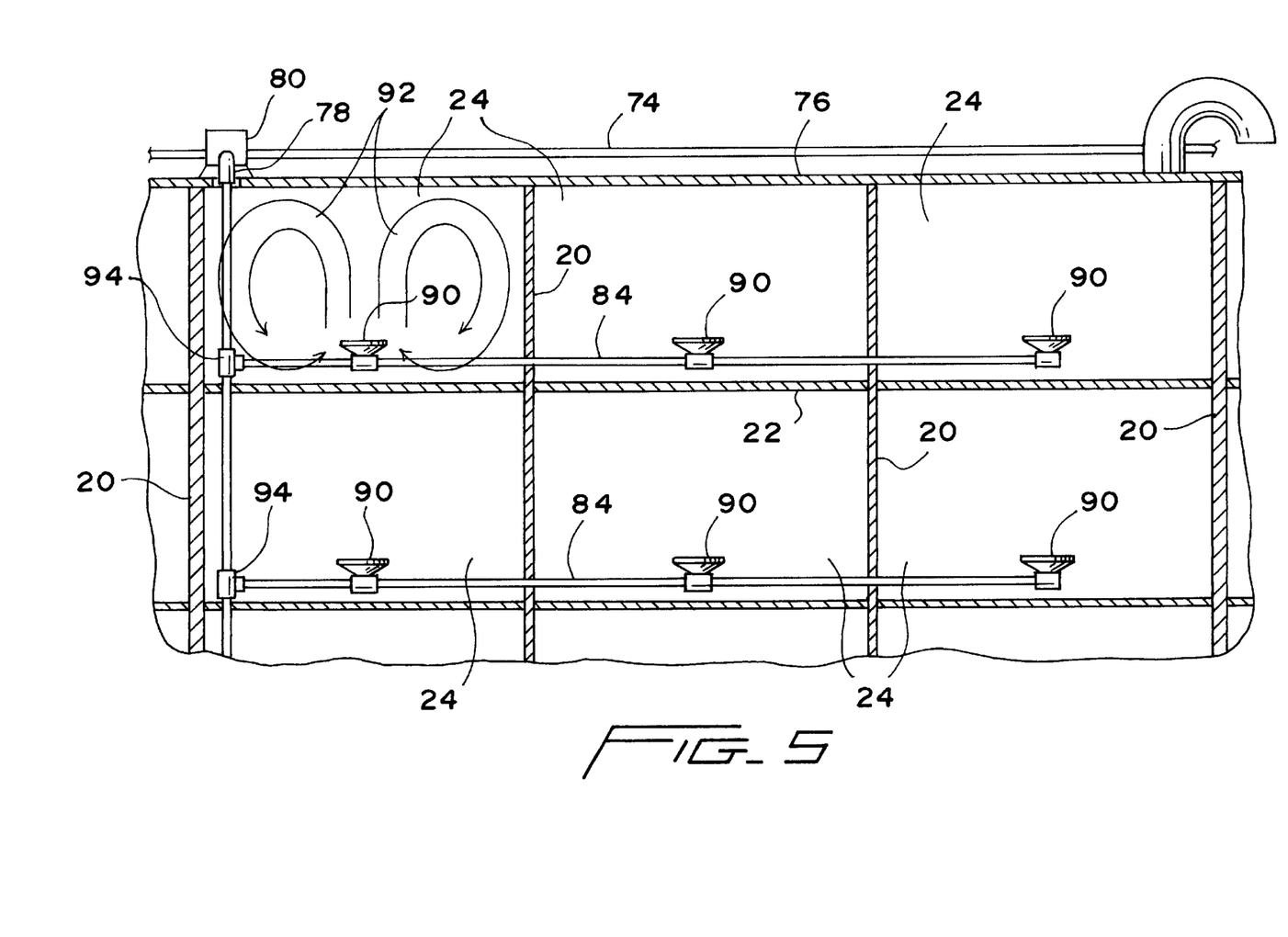
FIG. 5 is a cutaway fragmentary larger scale longitudinal section of the tanker along line B—B of FIG. 2 showing below deck portions of ballast tanks and treatment system and schematically showing ozone flow within one tank.
Figures 6, 7:
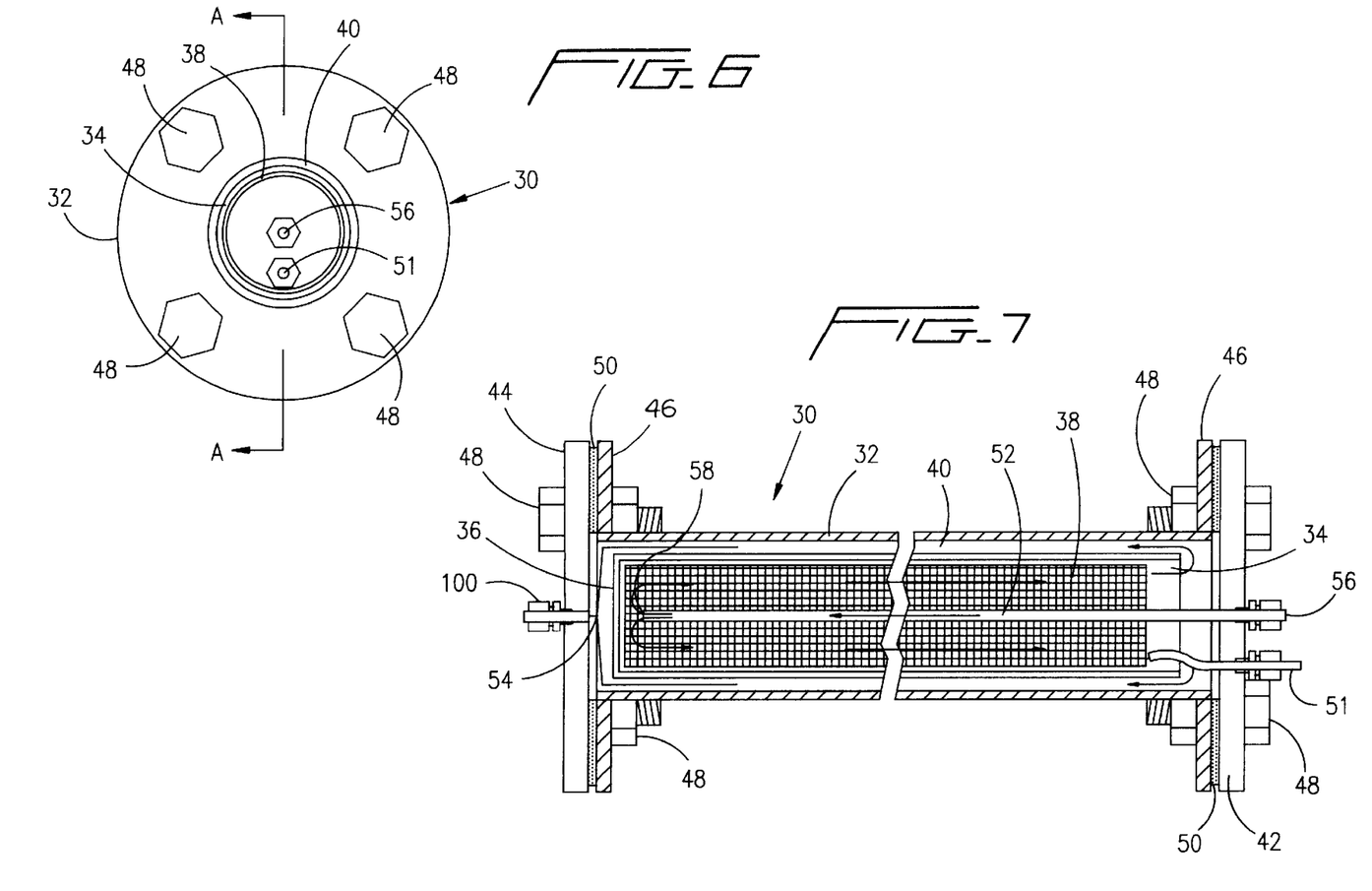
FIG. 6 shows a front end view of an ozone generator of the present invention that can be used in the present invention.
FIG. 7 shows a sectional view along the line A—A of the generator of FIG. 7.

As shown in FIGS. 1 to 5, main ozone feed line 74 runs from ozone generator 30 along top deck 76 parallel to the longitudinal axis of tanker 10. Off lines 78 intersect feed line 74 at 90° angles and connect to feed line 74 via valves 80. Each off line 74 runs from a respective valve 80 transverse to the feed line 74 and to the longitudinal axis of tanker 10, thence downwardly through top deck 76 into a ballast tank 24. As shown in FIGS. 3 to 5, tanker 2 includes a plurality of ballast tanks 24 arranged in both horizontal and vertical arrays between the tanker outer hull 8 and inner hull 10. Each vertical array extends transverse to the longitudinal axis of tanker 10 along the side of the tanker and along the tanker bottom as illustrated in FIG. 4. Each horizontal array extends parallel to the longitudinal axis of tanker 10 as shown in FIG. 5. FIG. 4 shows that each off line 78 extends down a vertical array and into an array of ballast tanks along the side of the tanker 2 and along the tanker bottom 82. A treatment line 84 extends from each off line 78 into a horizontal array of tanks 24. The treatment line 84 is shown extending into a horizontal array of three tanks 24. However, a treatment line 84 can extend into a horizontal array of any number of tanks. The tanks 24 are serially connected one after the other, to the ozone generator 30 by means of the treatment line 84 and off line 78 via the feed line 74. Each off line 78 includes consecutively connected treatment lines 84 from a first treatment line 84 to a final treatment line 84 connected near the termination 86 of the off line 78 near the keel 80 of the tanker 2. Tanks 24 are serially connected to each consecutively connected off line 78 in a manner as aforesaid.

A diffuser 90 connects to a treatment line 84 in each serially connected tank 24. The diffuser 90 is a duct, chamber or section in which a high-velocity, low-pressure stream of ozone is converted into a high-velocity high-pressure flow in the form of small uniform bubbles. A preferred diffuser is a rigid, monolithic, porous gas diffusion element formed of a body of solid particles and comprised of a partially coated, permeable ceramic substrate. Suitable diffuser elements are provided by Refractron Technologies Corporation, Newark, N.Y. under the trademark Soli- dome™. Such diffusers are disclosed by Sheckler et al. U.S. Pat. No. 5,215,686 and Sheckler et al. U.S. Pat. No. 5,560,874. The disclosures of these patents are incorporated herein by reference. In the present invention, the diffuser 90 injects ozone into water within a ballast tank 24 in the form of diffuse, substantially uniform bubbles that form a continuous cascading treatment pattern 92 within the tank 24 as illustrated in FIG. 5. Preferably, the diffuser 90 is located in the center of a bottom portion within each ballast tank 24 as shown.

Each treatment line is connected to an off line by means of a connector. The orifice of the connector between each off line and treatment line is constructed in a particular manner so as to regulate flow to each off line. Each connection includes a restricter orifice to maintain substantially equal flow of ozone into each serially connected tank or into each consecutively connected treatment line. Each succeeding orifice along a serially connected tank or along consecutively connected treatment line is proportionately restricted so as to substantially equalize flow into each succeeding tank.

Another embodiment of the invention is illustrated by FIGS. 1 to 3. FIGS. 1 to 3 show the in transit ozone treatment system including a source of air that can be located anywhere on a vessel with ballast water in need of treatment. FIGS. 1 to 3 show an air source 96 on bridge 26 of aft section 28 along side ozone generator 30. The air source can be any apparatus for the generation of air. In FIGS. 1 to 3, the air source 96 is an air compressor. An air feed line 98 runs from the air compressor along top deck 76 parallel to the longitudinal axis of tanker 10 and parallel to ozone feed line 74. The air feed line connects to each off line 78 via each valve 80. Each valve 80 can be activated to alternatively feed ozone from line 74 or air from line 98 into each off line 78. In this manner, the valve 80 controls infusion of ozone and air into each ballast tank 24 connected to a respective off line 78.

In operation, ozone is generated by ozone generator 30 and flows along the longitudinal axis of the tanker via main line 74. If valve 80 is actuated to connect an off line 78 to main line 74, the ozone will be diffused into ballast water of each tank 24 connected to the off line 78. The ozone infusion is continued until the ballast water is substantially treated. The extent of treatment can be determined by monitoring halide content of water within the tank. Ozone oxidizes halides in sea water. During ballast water treatment, ozone oxidizes bromide and iodide to bromine and iodine, both of which are highly toxic to the organisms in ballast water. During the process, the bromine and iodine is consumed in the destruction of the organisms. The bromine and iodine content of the water remains at a stable level until substantially all organisms have been destroyed. Then the bromine and iodine levels of the water begin to increase. According to the present invention, effectiveness of ozone treatment of ballast water within a tank can be monitored by monitoring the ballast water bromine and/or iodine content. Periodic sampling of the water can be conducted. When the bromine and/or iodine content commences to increase to residual levels of about 1 ppm to about 2 ppm or greater then biokill of organisms is assured and ozone treatment can be can be terminated.

Both flow rate and time of ozone treatment can be controlled to produce effective biokill all organisms in ballast water during transit from a port where the ballast water is charged into the vessel ballast tanks to a port where the ballast water is discharged. The requirement to exchange ballast water for sea water in the vessel while on the high seas is completely eliminated. As aforesaid, degree of biokill of organisms can be monitored and either or both period of treatment and rate of ozone injection can be controlled to accomplish this objective. In one aspect of the invention, an initial sampling of ballast water can be treated to determine a relationship among rate of ozone treatment, period of ozone treatment and requirements for substantial biokill of organisms within a unit of the ballast water. Subsequently, the remaining ballast water in the vessel can be treated according to the relationship while the vessel is in transit to port where the ballast water is discharged.

Valve 80 can act as a controlled connector to ozone generator 30 to infuse a flow of ozone into ballast tank water. Standard treatment times can be established by initial determination of the time to treat a determined volume of ballast water from a particular source. Or the ballast water can be continuously monitored to determine when to terminate treatment. When treatment has been conducted for a predetermined period or when monitoring indicates that the water is substantially treated, the valve is activated to terminate ozone flow.

However, it has been found that after treatment and termination of ozone flow, back flow causes scaling of the lines 84 to the ballast tanks 24. According to an embodiment of the invention, valve 80 is activated to terminate ozone flow and to commence air flow from line 98 into the treated ballast tank water. A flow of air can be maintained into the treated ballast tank water for a set period of time or until the water is discharged from the tank. The air performs at least two functions. Infusion of air maintains a positive pressure head into tank 24 and prevents back flow of water to prevent scaling of treatment lines 84. Additionally, the infusion of air continues mixing of bromine and/or iodine within the tank to enhance the treatment process.

While preferred embodiments of the invention have been described, the present invention is capable of variation and modification and therefore should not be limited to the precise details of the examples. The invention includes changes and alterations that fall within the purview of the following claims.

What is claimed:

1. A ballast water treatment system, comprising a source of ozone and a ballast tank connected to said source of ozone.

2. The ballast water treatment system of claim 1, comprising a ballast tank of a sea faring vessel.

3. The ballast water treatment system of claim 2, wherein said sea faring vessel is a double hull tanker.

4. The ballast water treatment system of claim 1, comprising a plurality of ballast tanks connected to said source of ozone.

5. The ballast water treatment system of claim 1, comprising a plurality of ballast tanks of a double hull tanker connected to said source of ozone by a feed line running from said source of ozone parallel to the longitudinal axis of said tanker.

6. The ballast water treatment system of claim 5, further comprising off lines from said feed line to said ballast tanks of said plurality of ballast tanks.

7. The ballast water treatment system of claim 1, additionally comprising a plurality of vertically stacked and horizontally arranged ballast tanks connected to said source of ozone.

8. The ballast water treatment system of claim 1, wherein said ballast tank is connected to said source of ozone by a line that terminates in a diffuser within said ballast tank.

9. The ballast water treatment system of claim 8, wherein said diffuser comprises a rigid, monolithic, porous gas diffusion element formed of a body of solid particles and comprised of a partially coated, permeable ceramic substrate.

10. The ballast water treatment system of claim 9, wherein said line terminates in a diffuser located in a center of a bottom portion within said ballast tank.

11. The ballast water treatment system of claim 10, comprising a plurality of ballast tanks, each said ballast tank connected to said source of ozone by a line that terminates in a diffuser within each of said ballast tank.

12. The ballast water treatment system of claim 1, additionally comprising a plurality of ballast tanks serially connected to said source of ozone by a line with serial off lines into each of said ballast tanks.

13. The ballast water treatment system of claim 1, additionally comprising a plurality of ballast tanks serially connected to said source of ozone by an off line with serial treatment lines into each of said tanks, each treatment line terminating in a diffuser within each of said ballast tanks.

14. The ballast water treatment system of claim 13, wherein each of said treatment lines terminates in a diffuser within each of said ballast tanks, said treatment line connected to said off line by means of a restricter orifice to maintain substantially equal flow of ozone into each of said treatment lines.

15. The ballast water treatment system of claim 1, wherein said ballast tank contains ballast water.

16. The ballast water treatment system of claim 15, wherein said ballast water is contaminated with zebra mussels (*Dreissena polymorpha*).

17. The ballast water treatment system of claim 1, additionally comprising a source of air connecting to said ballast tank.

18. The ballast water treatment system of claim 17, wherein said source of air is an air compressor connected to said ballast tank by a value that controls infusion of air into said ballast tank.

19. The ballast water treatment system of claim 18, wherein said source of ozone is connected to said ballast tank by said valve, which alternates infusion of ozone and air into said ballast tank.

20. The ballast water treatment system of claim 1, wherein said ozone source is a tubular ozone generator, comprising concentric inner tubular electrode/dielectric and outer tubular electrode with corona discharge zone between said inner tubular electrode/dielectric and outer tubular electrode, an electrode of said inner tubular electrode/dielectric having a scaled end and an open end, said outer tubular electrode having an open exhaust end concentric with said sealed end of said inner tubular dielectric and a closed end forming a port with said open end of said inner tubular dielectric and a tubular gas injector within and concentric with said inner tubular electrode/dielectric, said tubular gas injector having an inlet end to accept a gas feed and outlet end to inject a gas feed toward said sealed end of said inner tubular dielectric, whereby injected gas flows from said sealed end to dissipate heat within a zone between said concentric inner tubular electrode/dielectric and said tubular gas injector, thence through said port to said corona discharge zone wherein said gas flow is subjected to a corona discharge to form ozone and thence to exit said generator at said open exhaust end of said outer tube.

21. A double hull tanker, comprising an inner wall structure, an outer wall structure spaced apart from said inner wall structure to provide a space between said outer wall structure and said inner wall structure and plating to maintain said inner wall structure spaced apart from said outer wall structure to form said double hull;

a plurality of ballast water tanks defined by said wall structures and plating, and an ozone generator connected to at least one of said ballast tanks by means by a line that terminates in a diffuser within said at least one of said ballast tanks.

22. A method of controlling organisms in ballast water of a sea faring vessel, comprising treating said ballast water with ozone while said vessel is in transit between ports.

23. The method of claim 22, wherein said vessel is a double hull tanker.

24. The method of claim 22, comprising treating said ballast water in a ballast water tank.

25. The method of claim 22, comprising treating said ballast water in a plurality of ballast water tanks.

26. The method of claim 25, comprising sequentially batch treating said ballast water in a plurality of ballast water tanks.

27. The method of claim 22, comprising treating with ozone by injecting said ozone into said ballast water at high pressure between about 80 psi and about 120 psi.

28. The method of claim 22, comprising determining a relationship among rate of ozone treatment, period of ozone treatment and requirements for substantial biokill of organisms within a unit of ballast water charged into ballast tanks of said vessel at a first port and subsequently treating said ballast water according to said relationship while said vessel is in transit to a second port.

29. The method of claim 22, additionally comprising monitoring said treating to determine an extent of treatment of organisms in said ballast water.

30. The method of claim 29, further comprising controlling said treating of said ballast water in response to said monitoring.

31. The method of claim 29, further comprising controlling dosage of said ozone, period of time of treatment of said ozone or both in response to said monitoring.

32. The method of claim 29, further comprising controlling said treating of said ballast water in response to said monitoring and terminating said treating when said monitoring indicates substantial treatment of organisms in said ballast water.

33. The method of claim 32, comprising terminating said treating when said monitoring indicates a bromine or iodine content in said ballast water of between about 1 ppm to about 2 ppm or greater.

34. The method of claim 22, comprising activating flow of ozone from said source to said ballast tank to treat said ballast water and deactivating said flow after a determined period of treatment.

35. The method of claim 22, additionally comprising terminating said treating of ozone and injecting air into said ballast water to agitate said ballast water.

36. The method of claim 22, wherein said ozone is injected into said ballast water in the form of high velocity, substantially uniform bubbles to treat said ballast water.

37. The method of claim 36, wherein said ozone is injected into said ballast water by means of a rigid, monolithic, porous gas diffusion element formed of a body of solid particles and comprised of a partially coated, permeable ceramic substrate.

38. A method of ozone treating organisms in an aqueous environment contained in a tank, comprising injecting ozone into said aqueous environment within said tank until said organisms are substantially treated and injecting air into said water environment to agitate said water environment.

* * * * *